UNITED STATES PATENT OFFICE.

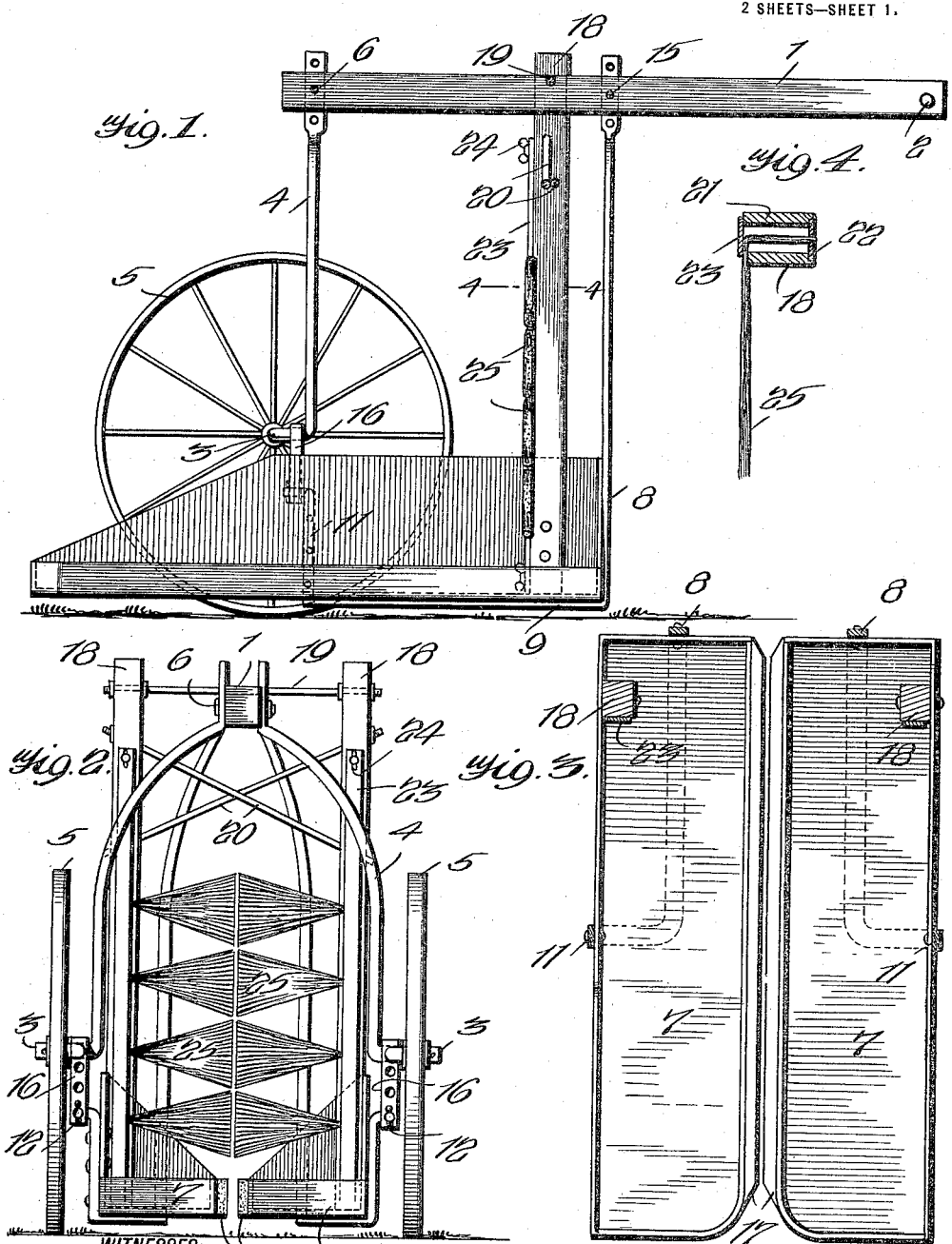

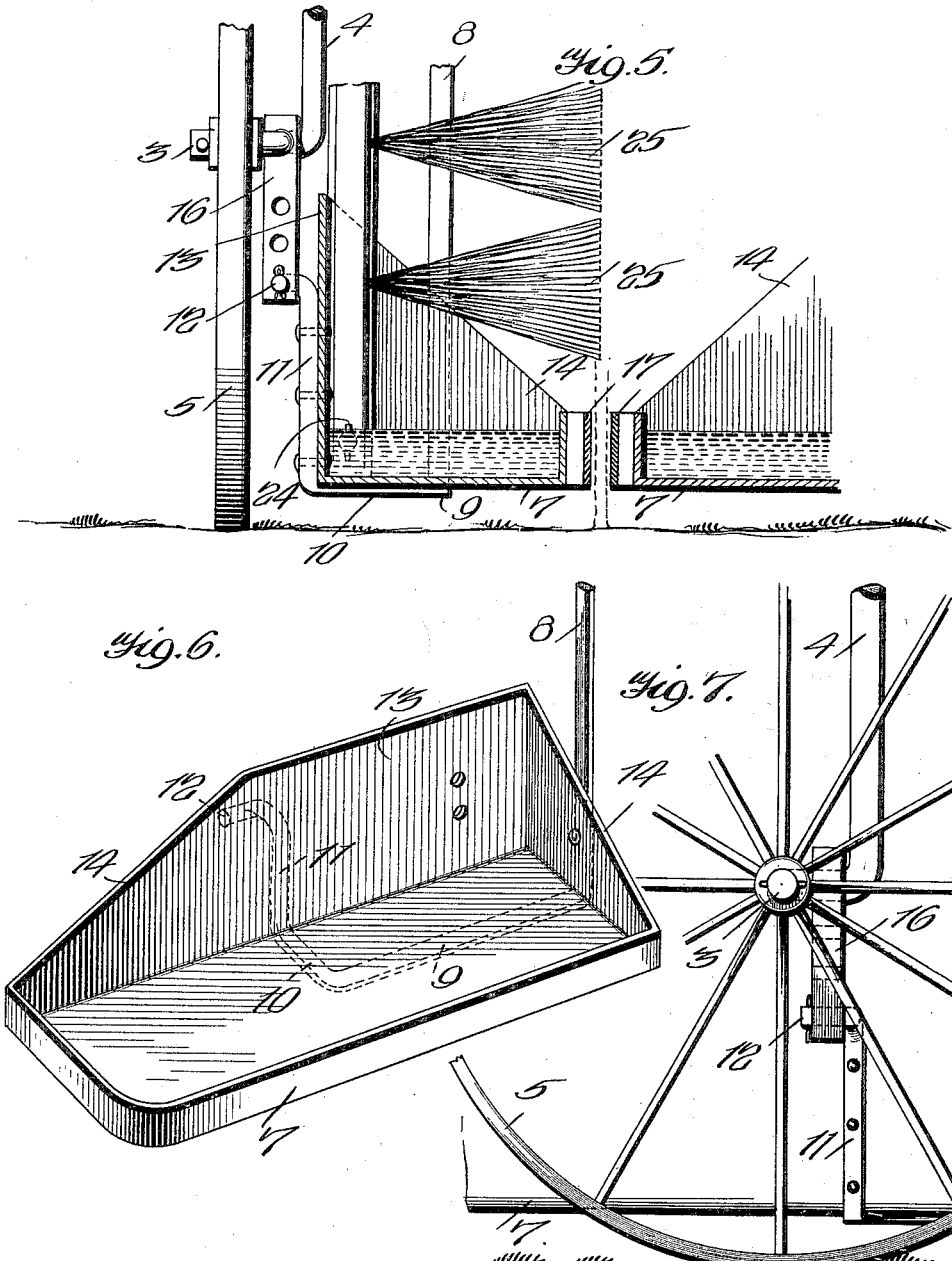

EDWIN C. POELLNITZ, OF MYRTLEWOOD, ALABAMA.

BOLL-WEEVIL DESTROYER.

1,193,296. Specification of Letters Patent. Patented Aug. 1, 1916.

Application filed April 7, 1916. Serial No. 89,623.

*To all whom it may concern:*

Be it known that I, EDWIN C. POELLNITZ, a citizen of the United States, and a resident of Myrtlewood, in the county of Marengo and State of Alabama, have invented a new and useful Improvement in Boll-Weevil Destroyers, of which the following is a specification.

My invention is an improvement in boll weevil destroyers, and has for its object to provide a machine of the character specified, wherein a supporting frame is provided having depending pans spaced apart from each other to permit the plants in the row to pass between the pans and adjustable vertically with respect to the frame, the pans being adapted to contain a poisonous solution, and wherein a particular form of dislodging means is provided for dislodging the weevil from the plants and knocking them into the solution in the pans.

In the drawings:—Figure 1 is a section on the line 1—1 of Fig. 2, Fig. 2 is a front view, Fig. 3 is a horizontal section at the level of the receiving pans, Fig. 4 is a section on the line 4—4 of Fig. 1, Fig. 5 is an enlarged detail section showing the adjusting mechanism for the pans, Fig. 6 is a perspective view of one of the pans, and Fig. 7 is a side view of Fig. 5.

The present embodiment of the invention comprises a beam 1, having at its rear end a cross handle 2, and spindles 3 are connected with the other end of the beam 1, each spindle having an integral bracket 4 at its inner end, and the brackets have their upper ends offset inwardly into contact with the beam and are adjustably connected therewith. A wheel 5 is journaled on the spindle and the upper end of each bracket 4 is provided with a series of openings, the openings of the two brackets registering for receiving a cross bolt 6, for connecting the brackets with the beam. Two pans 7 are provided, and the pans are adjustably connected with the beam and with the brackets. Each pan is connected to the beam and to the bracket 4 by means of a bar consisting of a vertical portion 8 and a horizontal portion 9 extending from the lower end of the vertical portion. This horizontal portion fits beneath the pan as shown in Figs. 2, 3 and 6 and extends longitudinally of the pan to near the center. Here each bar has an outwardly bent portion 10 extending to the outer edge of the pan and terminating in an upwardly bent portion 11, each of the said portions having a laterally extending pin 12 at its upper end. The portion 11 of each bar is riveted to the outer wall of the pan, and it will be noted that the said wall 13 is much higher than the inner and front walls and is connected to the ends of the said walls by inclined or beveled portions 14.

The portion 8 of each bar has its upper end offset inwardly to lap upon the adjacent end of the beam and the said end is given a quarter turn and is provided with openings, the openings registering for receiving a cross bolt 15, which adjustably connects the said ends to the beam. The pin 12 of each portion 11 is engaged with one of a series of openings in a hanger 16, depending from the connection between the adjacent spindles 3 and 6 and the bracket 4.

It will be evident that by engaging the bolt 15 with different openings in the upper ends of the portions 8 of the supporting bars for the pans and by engaging the pins 12 of the said bars with different openings of the hangers 16 the height of the pans from the ground may be varied. Each pan has its forward inner corner beveled as shown more particularly in Figs. 3 and 6, and a buffer 17 of rubber or the like is secured to the inner wall of each pan, the buffers having their ends beveled as shown, and the pans are so arranged with respect to each other that there is just room for the plants indicated in dotted lines in Fig. 5 to pass between the buffers. As shown in Fig. 5 these buffers may be strips of rubber facing blocks which are secured to the walls of the pans.

Means is also provided for dislodging the weevil and the dead squares from the plants, and the said means is connected with the pans. A pair of vertical bars 18 is arranged near the rear ends of the pans and at the outer walls, the said bars being connected at their upper ends by a cross rod 19 and near their upper ends by inclined brace bars 20. At their lower ends the bars are riveted to the outer walls of the pan as shown in Figs. 1 and 3, and a dislodging mechanism is connected with the bars, the said bars being arranged directly in front of the portions 8 of the supporting bars for the pans.

The bars 18 are longitudinally slotted from near their upper ends to near their lower ends as indicated at 21, and a plate 22 is connected with each bar over the rear opening of the slot 21. A second plate 23 is arranged at the front opening of each slot, the said plates 23 having openings at their ends for receiving threaded stems which are engaged by wing nuts 24 to clamp the plates 23 in place over the slots. The plates 22 are countersunk in the rear faces of the bars 18, as shown in Fig. 4, and these plates carry a series of fan-shaped dislodging members 25. Each of the said members 25 is approximately triangular, arranged with its base inward and with its apex connected with the plate 22. Each member extends through the slot 21 and is then bent laterally inward as shown in Figs. 2 and 4, and is held in such position by the plate 23. The inner ends or bases of the dislodging members as shown in Fig. 2, are almost in contact but the said members have sufficient flexibility to permit them to be moved rearwardly to permit the passage of the plants. However, the bases of the said members brush the plants dislodging damaged squares and all weevil that may be on the plants. The weevil and the damaged squares fall into the pans and a poisonous solution is placed in the pans for killing the weevil. The dislodging members 25 are of leather or rubber having sufficient rigidity to hold their position and sufficient flexibility to permit the passage of the plants without damage and sufficient resiliency to resume their original positions when the stress tending to displace them is removed.

In operation, the machine is pushed or drawn through the field as may be desired with the plants in the row moving through the passage between the blocks 17, and it will be noticed that the front end of the passage is open to permit the easy entrance of the plants. As the foliage of the plants is engaged by the dislodging members 25 the boll weevil and the damaged squares will be dislodged falling into the poisonous solution in the pans from whence they may be removed and disposed of. The height of the pans above the ground may be adjusted by means of the bars 8 and 9. With the pans the dislodging members 25 are also adjusted. When these members become worn or broken they can be easily replaced by loosening the wing nuts 24 and removing the damaged fans or dislodging member. The brackets 4 constitute what is in effect a sectional arched axle, the sections being connected to the beam and adjustable vertically with respect thereto, and the said axle is provided for spacing the spindles below the beam.

I claim:—

1. A boll weevil destroyer, comprising a beam, a sectional arched axle having wheels at the outer ends of the sections, the inner ends of the sections being connected to the beam for vertical adjustment thereon, receiving pans of approximately rectangular outline arranged below the beam and between the wheels and spaced apart at their adjacent sides to form a passage extending longitudinally of the machine, a supporting bar for each pan connected at one end of the beam and at the other to the adjacent end of the axle and adjustable vertically with respect to the beam to raise and lower the pan, a supporting bar extending upwardly from each pan at the outer side thereof and near the rear ends, said bars being in register and being connected at their upper ends, and a series of dislodging members detachably connected with each bar.

2. A boll weevil destroyer, comprising a beam, spindles connected with the beam and spaced below the same and wheels on the spindles, a hanger on each spindle, a plurality of pans supported below the beam and spaced apart from each other to permit the passage of the plants in the row, and a supporting bar for each pan, each bar being connected at one end to the beam and at the other end to the hanger on the adjacent spindle and being adjustable with respect to the beam and the hanger to permit the pans to be adjusted vertically.

3. In a boll weevil destroyer, a pair of pans, means for supporting the pans to pass on each side of the row, a supporting bar extending upwardly from each pan, each bar having a series of flexible inwardly extending dislodging members arranged in the same vertical plane and coöperating with the members of the other bar to dislodge the weevil, each of the said members being approximately triangular and having its apex detachably connected with a bar, said connection comprising a vertical slot in the bar at right angles to the plane of the members, a plate secured to the bar at one opening of the slot to which the members are connected, and a second plate detachably connected with the bar at the opposite end of the slot, and pressing said members toward the bar to cause them to extend inwardly toward the members of the other bar.

4. In a boll weevil destroyer, oppositely positioned vertical series of dislodging members, each consisting of a substantially triangular member of flexible resilient material, the members of each series being supported by their apices in the same vertical plane, and with their bases adjacent to the bases of the other series.

EDWIN C. POELLNITZ.